May 20, 1958 J. ENSINK 2,835,739

SINGLE-SIDEBAND CARRIER-WAVE TELEPHONE SYSTEM

Filed March 14, 1952 2 Sheets-Sheet 1

May 20, 1958 J. ENSINK 2,835,739

SINGLE-SIDEBAND CARRIER-WAVE TELEPHONE SYSTEM

Filed March 14, 1952 2 Sheets-Sheet 2

INVENTOR
Johannes Ensink

United States Patent Office 2,835,739

Patented May 20, 1958

2,835,739

SINGLE-SIDEBAND CARRIER-WAVE TELEPHONE SYSTEM

Johannes Ensink, Hilversum, Netherlands, assignor, by mesne assignments, to North American Philips Company, Inc., New York, N. Y., a corporation of Delaware Application March 14, 1952, Serial No. 276,471

Claims priority, application Netherlands April 12, 1951

2 Claims. (Cl. 179—15)

The invention relates to single-sideband carrier-wave telephone systems, in which the channels are transmitted through two adjacent pairs of conductors in which at least through each pair a group of channels is transmitted in the same direction, these two groups lying within the same group-frequency band, the channels of one group having a frequency shift with respect to the channels of the other group, a signalling carrier-wave being associated with each channel.

It is known that such systems have been designed both for transmission through open wire lines and through cables, in order to fulfil the conditions with respect to cross-talk between adjacent channels or adjacent pairs of conductors in a simple manner and with less severe requirements of balancing for the pairs.

The invention has for its object to provide a system in which the terminal apparatus is simplified primarily by simplifications in the arrangements of the apparatus for transmitting and receiving the signalling pulses, dial pulses and the like associated with each channel.

According to the invention, a single sideband carrier-wave telephone system, in which the transmission of the channels is performed through two adjacent pairs of conductors in which at least through each pair a group of channels is transmitted in the same direction, these two groups lying within the same group-frequency band, the channels of one group having a frequency shift with respect to the channels of the other group, a signalling carrier-wave being associated with each channel, is characterized in that at least a plurality of signalling carrier-wave frequencies of channels of one group are equal to carrier-wave frequencies of channels of the other group and conversely, and in that the signalling carrier-waves are transmitted through the phantom circuit of the two pairs.

The system according to the invention is particularly suitable for use where the two pairs of conductors are comprised in a star quad cable and also applies to open wire conductors.

In order that the invention may be more clearly understood and more readily carried into effect, it will now be described more fully with reference to the accompanying diagrammatic drawings given by way of example, in which.

Figure 1:
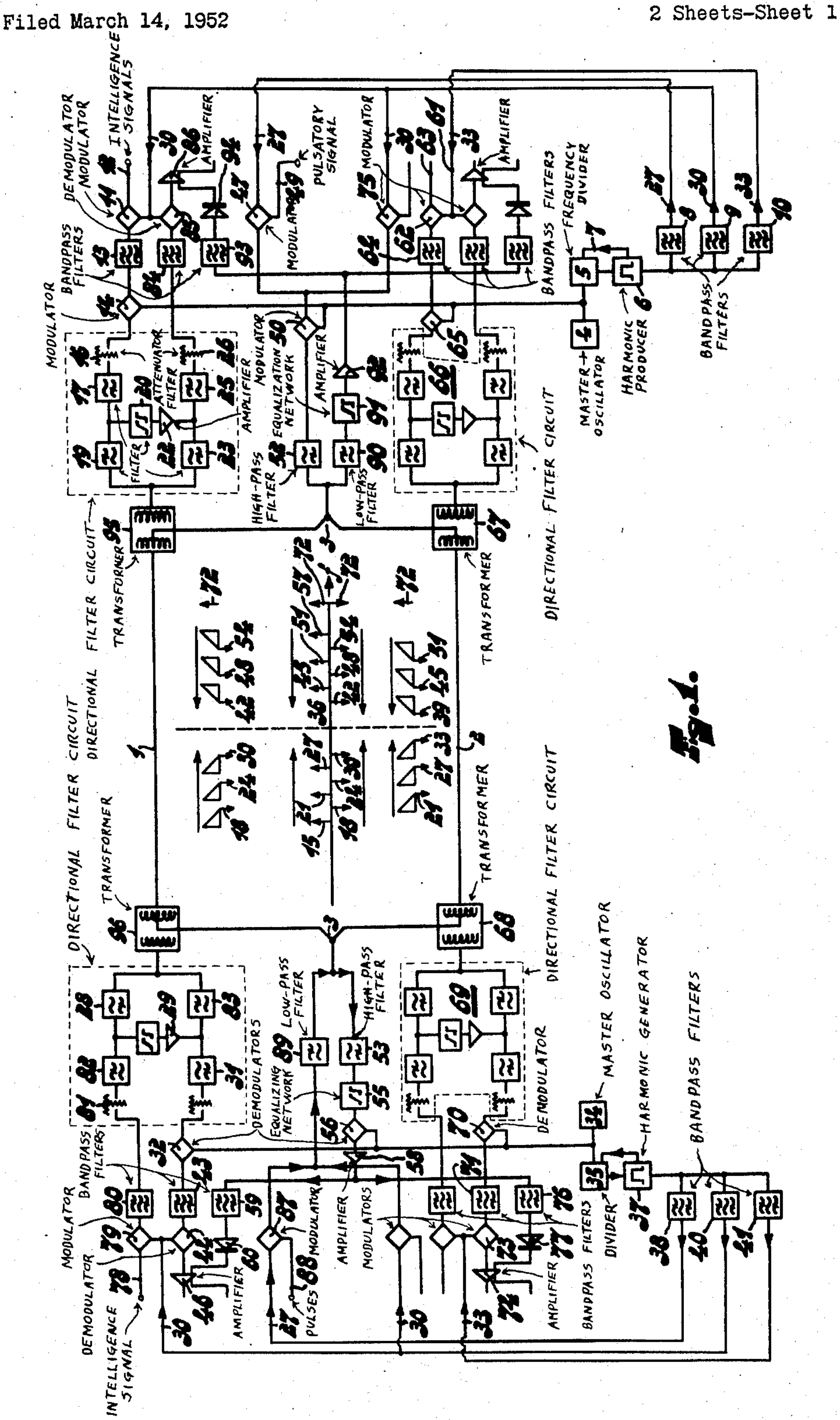
Fig. 1 shows part of the terminal apparatus in one embodiment of a system according to the invention, the position of the channels also being shown in a frequency diagram.

With the single-sideband carrier-wave telephone system shown in Fig. 1 transmission takes place through the two pairs of conductors 1 and 2, which are shown each by a single line, for the sake of simplicity. Provision is furthermore made, in known manner, of a phantom circuit 3 (shown diagrammatically).

In the direction left-right three channels are transmitted through the pair 1. The bandwidth of each channel is 4 kc./s. and the frequencies of the carrier-waves, which are suppressed, are 18, 24 and 30 kc./s., that is a difference of 6 kc./s. exists between adjacent carrier waves and the frequency interval between successive channels is 2 kc./s. The lower sidebands are used so that for the channel having the lowest position in the frequency band, the channel frequency of 4 kc./s. lies at 14 kc./s. and the channel frequency 0 corresponds to 18 kc./s.

A group of three channels is also transmitted in the direction left-right through the pair 2. This group lies in the same group frequency band as that of the pair 1, i. e., below 36 kc./s. The lower sidebands are again used and the frequency intervals between successive channels, which also have a bandwidth of 4 kc./s., is again 2 kc./s.

The channels of the second group have, however, a frequency shift of 3 kc./s. with respect to the channels of the first group.

Thus the first channel of the first group extends from 14 to 18 kc./s. and the first channel of the second group extends from 17 to 21 kc./s.

By such a choice of the position of two groups of channels transmitted through adjacent pairs in the same direction the risk of cross-talk between the two pairs is considerably reduced.

For each of the channels to be transmitted is provided a signalling carrier-wave. For this purpose use is made as much as possible of the carrier-wave frequencies of the channels already produced in the terminal apparatus. Thus, the carrier-wave frequencies of 18, 24 and 30 kc./s. associated with the group of channels of the pair 1 are used as signalling carrier-wave frequencies for the channels of the group 2.

The first channel of the second group, which extends from 17 to 21 kc./s., is then associated with a signalling carrier-wave frequency of 18 kc./s. Owing to the lower-sideband position of this channel, this frequency of 18 kc./s. corresponds with a channel frequency of 3 kc./s. The signalling in this channel is thus effected in the intelligence frequency band.

The signalling frequency of 18 kc./s. for the first channel of the second group corresponds, as stated above, with the carrier-wave frequency of the first channel of the first group, so that this frequency thus represents a frequency 0 for the first channel. Thus this signalling frequency does not give rise to interference in the first channel of the first group.

The carrier-wave frequencies of 21 and 27 kc./s. of the first and the second channels of the second group are used as signalling carrier-wave frequencies for the second and the third channels of the first group. For the first channel of the first group is chosen a signalling carrier-wave frequency of 15 kc./s. The fact that in this case the three carrier-wave frequencies of 21, 27 and 33 kc./s. are not used for signalling for the successive channels of the first group, is, as will be obvious, due to the frequency of 21 kc./s. lying without the frequency band of the first channel of the first group, but within the frequency band of the second channel.

The signalling carrier-wave frequencies for the channels of the first group again correspond with channel frequencies of 3 kc./s. and the frequencies of 21 and 27 kc./s. correspond, with respect to the channels of the second group, with the channel frequency 0 or with multiples of 6 kc./s.

The said six signalling carrier-waves are transmitted through the phantom circuit, so that the separation between intelligence frequencies and signalling frequencies does not give rise to difficulties, since they are transmitted separately. The interval between the signalling frequencies is, moreover, 6 kc./s., so that their relative separation can be carried out in a simple manner.

Moreover, the frequency band available for each signal transmission has a width of 6 kc./s., so that, when use is made of signalling impulses, the impulses occurring are little distorted, so that little or no impulse correction need be carried out at the signal receiver.

It is also observed that the line amplifiers are not loaded by the signalling, so that this may be carried out, for example, as closed circuit signalling.

So far reference has been made only to the transmission in the direction left-right and it will be obvious, that, if transmission is made in this direction only and if the pairs are suitable for the transmission of a large frequency band, more than three channels may be provided for each pair. Moreover, group modulation may be carried out in this case.

However, in the system shown in Fig. 1, channels are also transmitted in the direction right-left through each pair.

Through the pair 1 a group of three channels is transmitted in the direction right-left. The upper sidebands are used and the carrier-wave frequencies are 42, 48 and 54 kc./s., so that the frequency interval between successive channels is 2 kc./s.

Through the pair 2 also a group of three upper-sideband channels are transmitted; these channels are shifted in frequency by 3 kc./s. with respect to the channels of the pair 1 and the carrier-wave frequencies are 39, 45 and 51 kc./s.

The signalling carrier-wave frequencies are shown in Fig. 1 and are chosen similarly to those for the channels in the direction left-right, so that further description is dispensed with. It should, however, be noted that these signalling carrier-waves are transmitted through the phantom circuit in the direction right-left.

Again, with a sufficiently large frequency band of the pairs a greater number of channels may be transmitted in both directions than is shown in Fig. 1.

Fig. 1 also shows part of the terminal apparatus at the two stations, for each pair of each station, only the apparatus for transmitting and receiving one channel is shown in order to simplify the figure.

The carrier-wave oscillators at the two stations are synchronised, a synchronising pilot frequency of 72 kc./s. being transmitted from right to left through the phantom circuit.

The master oscillators at the two stations have a frequency of 72 kc./s. and this frequency is also used in modulator stages at the two stations.

The right-hand station comprises the master oscillator 4. The output voltage of the oscillator 4 is supplied to a frequency dividing stage 5, in which a division by a factor 24 takes place. The output voltage of stage 5, having a frequency of 3 kc./s. is supplied to a circuit 6, in which harmonics of this frequency are produced. For stabilising the frequency dividing stage feedback is provided to the dividing stage 5 through line 7.

Since all the frequencies required are multiples of 3 kc./s. they may be taken from the output circuit of the circuit 6 via bandpass filters 8, 9 and 10.

The part of the right-hand station shown comprises only the apparatus for transmitting the channel of the pair 1 having a carrier-wave frequency of 42 kc./s. and for the reception of the channel having a carrier-wave frequency of 30 kc./s. of this pair, the apparatus for transmitting the channel having a carrier-wave frequency of 39 kc./s. of the pair 2 and for the reception of the channel having a carrier-wave frequency of 33 kc./s. of the pair 2 and the apparatus for transmitting and receiving the associated signalling carrier-waves. Four carrier-wave frequencies only, i. e., 72, 33, 30 and 27 kc./s., are required for this purpose, owing to the choice of the signalling carrier-wave frequencies and since the channels transmitted in the two directions lie in pairs symmetrically with respect to the frequency of 36 kc./s., i. e., with respect to half the frequency of the master oscillator 4.

From the bandpass filter 9 is taken a carrier-wave having a frequency of 30 kc./s., which is supplied to a modulator 11, intelligence signals being supplied to the modulator 11 by a conductor 12.

Across the output circuit of the modulator 11 two sidebands are produced. The upper sideband is suppressed with the use of a bandpass filter 13 and the lower sideband extending from 26 to 30 kc./s., is allowed to pass and supplied to a modulator 14. To this modulator is also supplied from the master oscillator 4 the carrier-wave of frequency 72 kc./s. The lower sideband 42 to 46 kc./s. occurring across the output circuit is supplied through an attenuator 16, to a high bandpass filter 17, having a lower limit frequency of 36 kc./s. The band 42 to 46 kc./s. cannot pass through a low bandpass filter 19, having a higher limit frequency of 36 kc./s. and follows a path via an equalisation network 20, an amplifier 22 and a high bandpass filter 23, having a lower limit frequency of 36 kc./s. It is observed that the sideband is not transmitted via a low bandpass filter 25, having a higher limit frequency of 36 kc./s.

Directional filter circuit arrangements of the kind described above are known and the operation of these directional filter circuits will therefore not be further explained herein.

The sideband 42 to 48 kc./s. is then supplied through a transformer 95 to the pair 1. At the left-hand end the intelligence is supplied through a transformer 96 to a directional filter circuit and reaches a demodulator 32 via the path 28, 29, 31.

To the demodulator 32 is supplied a carrier-wave having a frequency of 72 kc./s. from master oscillator 34, which is synchronised in known manner with the master oscillator 4 with the use of the transmitted pilot frequency of 72 kc./s. The transmission circuit and the synchronising circuit are not shown in Fig. 1. From the master oscillator 34, via a dividing stage 35 and a harmonic generator 37, the carrier-wave frequencies required are taken through bandpass filters 38, 40, 41, and so on.

Two sidebands are produced across the output circuit of the demodulator 32 of which only the lower sideband 26 to 30 kc./s. is allowed to pass by a bandpass filter 43 and supplied to a demodulator 44 to which is also supplied a carrier-wave of frequency 30 kc./s. from the bandpass filter 40.

A low-frequency intelligence signal 0 to 4 kc./s. is produced across the output circuit of the demodulator 44 and is amplified in a channel amplifier 46.

The channel amplifier 46 is partly combined with the signal receiver in a manner suggested before.

The signalling associated with this channel is performed as follows:

A carrier-wave having a frequency of 27 kc./s. is supplied from the bandpass filter 8 of the right-hand station to a modulator 47, in which modulation takes place under the control of a pulsatory signal supplied to a line 49.

The signal obtained is supplied to a modulator 50, to which is also supplied a carrier-wave having a frequency of 72 kc./s. from the master oscillator 4. The signalling having a carrier-wave frequency, which is now 45 kc./s., is supplied via a high bandpass filter 52 to the phantom circuit 3.

In the left-hand station this signal is supplied through a high bandpass filter 53, having a lower limit frequency of 36 kc./s., and an equalisation network 55 to a demodulator 56, to which is also supplied a carrier-wave having a frequency of 72 kc./s., from master oscillator 34.

The demodulation product having a carrier-wave frequency of 27 kc./s. is supplied through an amplifier 58 and a bandpass filter 59 to a rectifier 60. The pulsatory direct voltage obtained by rectification changes the operational condtion of the signal receiver and the channel amplifier 46 in accordance with the signals supplied at 49 in the right-hand station.

The transmission right-left of the channel having a carrier-wave frequency of 39 kc./s. through the pair 2 is performed in an exactly similar manner with the use of the apparatus coupled with the pair 2. For the sake of clearness it is stated that for this purpose use is made of a carrier-wave having a frequency of 33 kc./s. from the bandpass filter 10, this carrier-wave being supplied via a lead 61 to a modulator 62, to which is supplied the intelligence to be transmitted through a line 63. One of the sidebands produced is supplied through a bandpass filter 64 to a modulator 65, across which is operative the carrier-wave voltage having a frequency of 72 kc./s. from master oscillator 4. The sideband produced of 39 to 43 kc./s. is supplied through a directional filter circuit-arrangement 66 and a transformer 67 to the pair 2.

At the receiver end the sideband traverses a transformer 68 and a directional filter circuit-arrangement 69 and reaches a demodulator 70, to which is supplied a carrier wave having a frequency of 72 kc./s. from master oscillator 34.

The desired sideband produced is supplied through a bandpass filter 71 to a demodulator 73, in which the signal having a carrier-wave frequency of 33 kc./s. from the bandpass filter 71 is demodulated. Amplification then takes place in a channel amplifier 74.

Signalling is performed by starting from a carrier-wave having a frequency of 30 kc./s., taken from the bandpass filter 9 of the right-hand station. This carrier-wave is modulated by impulses in a modulator 75 and then supplied to the modulator 50, where it is mixed with the carrier-wave having a frequency of 72 kc./s. from master oscillator 4. The signal having the carrier-wave freqeuncy of 42 kc./s. thus produced is supplied through the high bandpass filter 52 to the phantom circuit 3.

In the left-hand station, the signalling voltage traverses the high bandpass filter 53 and the equalisation network 55 and reaches the demodulator 56, in which demodulation takes place with the use of the 72 kc./s. carrier-wave.

The signalling voltage, which now has again a carrier-wave frequency of 30 kc./s., traverses a bandpass filter 76 and a rectifier 77. The rectified signal controls the signal receiver and the channel amplifier 74.

The transmission of intelligence through the channel having a carrier-wave frequency of 30 kc./s. through the pair 1 from left to right is performed as follows:

The low-frequency intelligence signal is supplied through a line 78 to a modulator 79, to which is also supplied a carrier-wave having a frequency of 30 kc./s.

The lower frequency band 26 to 30 kc./s., which is thus produced, is allowed to pass through a bandpass filter 80 and supplied to the directional filter circuit, which is traversed via a path 81, 82, 29 and 83. The sideband is then supplied through the transformer 96 to the pair 1, from which it is taken in the right-hand station with the use of the transformer 95.

In the directional filter circuit then following the intelligence signal follows a path 19, 20, 22, 25, 26 and reaches through a bandpass filter 84, a demodulator 85, where demodulation takes place with a carrier-wave having a frequency of 30 kc./s. The low-frequency intelligence is thus produced and amplified by a channel amplifier 86.

For the signalling in this channel, use is made in the left-hand station of a carrier-wave having a frequency of 27 kc./s., which is supplied to a modulator 87, where it is modulated by impulses supplied through a line 88. The signal obtained is supplied through a low bandpass filter 89 to the phantom circuit 3.

At the receiver end, the signal voltage traverses a low bandpass filter 90, an equalisation network 91, an amplifier 92 and a bandpass filter 93, after which rectification takes place in a rectifier 94.

The rectified output voltage acts upon the operational condition of the channel amplifier and the signal receiver 86.

The transmission of intelligence signals and of the associated signalling from left to right through the pair 2 is performed in an exactly similar manner, and no description thereof is therefore given.

As will be evident from the description of Fig. 1, modulation and demodulation takes place only once in communication from left to right, whereas in the direction from right to left two modulation stages and two demodulation stages are used. In this case, the first modulation stage and the last modulation stage in the right-hand station are identical with the modulation stage and the demodulation stage respectively in the left-hand station, which is due to the fact that for the two directions the channels are in pairs symmetrical with respect to a definite frequency, in this case, a frequency of 36 kc./s., which is simply obtained with the use of the second modulation stage, to which is supplied a carrier-wave frequency of 72 kc./s., i. e. twice 36 kc./s., for all channels in the direction right-left. Thus a simple construction of the terminal apparatus is obtained.

With the system shown in Fig. 1, the frequency interval between successive channels of one pair and for one direction is equal to 2 kc./s. and the shift between the channels of two pairs is 3 kc./s.

Figure 2:
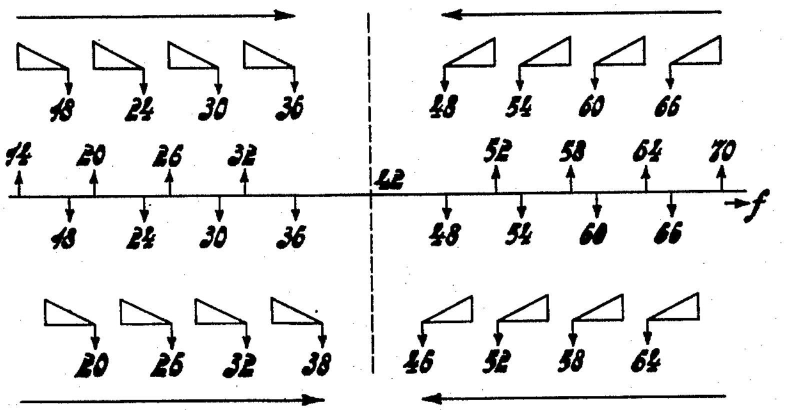
Fig. 2 shows a frequency diagram for the position of the channels in a second embodiment of a system according to the invention and Figs. 3 and 4 show the frequency diagrams of a third and a fourth embodiment thereof.

If the shift is chosen to be equal to 2 kc./s., a system is formed, of which the nature is largely identical with that shown in Fig. 1 and of which Fig. 2 shows only the the position of the channels, the carrier-wave frequency and the signalling carrier-wave frequencies in a frequency diagram.

In the direction from left to right four channels are transmitted through the upper and the lower pair, which is also the case in the direction from right to left. The second channel in the direction from left to right of the upper pair extends, for example, from 20 to 24 kc./s. and that of the lower pair from 22 to 26 kc./s.

The 24 kc./s. carrier-wave of the first mentioned channel is transmitted through the phantom circuit as a signalling carrier-wave for the corresponding channel of the lower pair. Thus this frequency of 24 kc./s. takes up a position in this lower channel corresponding with 2 kc./s.

Conversely, the 26 kc./s. carrier-wave of the lower channel serves as a signalling carrier-wave for the third channel of the upper pair, where its position corresponds with 4 kc./s.

The further positions will be sufficiently clear from the figure. All required carrier-wave frequencies are multiples of 2 kc./s.

Figure 3:
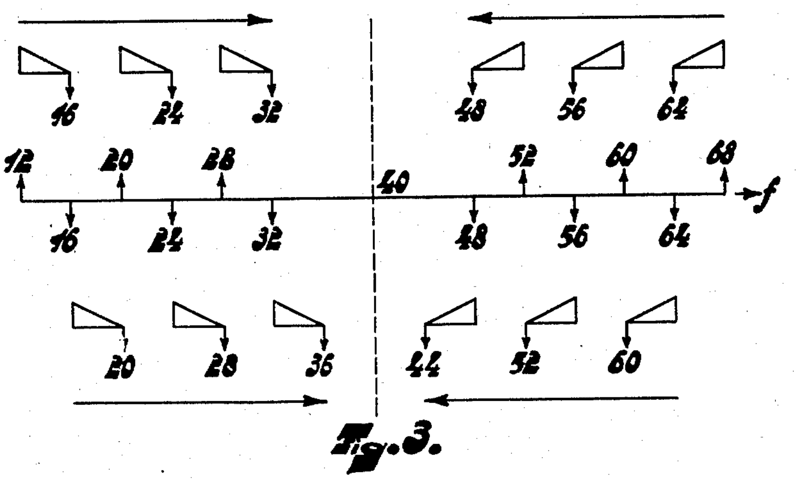

Fig. 3 shows a frequency diagram of a system in which the frequency interval between successive channels is 4 kc./s. and the channels of the two pairs have a relative frequency shift of 4 kc./s.

Such a system requires, it is true, double the bandwidth for the transmission of a given number of channels, as compared with a system in which successive channels are adjacent one another, but on the other hand the terminal apparatus is, in this case, considerably simpler.

It will be evident from Fig. 3 that the frequency interval of 4 kc./s. between successive channels of one pair is exactly occupied by a channel of the other pair, transmitted in the same direction.

The 24 kc./s. carrier-wave of the second channel of the upper pair serves as a signalling carrier-wave for the second channel of the lower pair and operates for this channel as a frequency of 4 kc./s.

Conversely, for example, the 28 kc./s. carrier-wave of the second channel of the lower pair is at the same time a signalling carrier-wave for the third channel of the upper pair, in which it also corresponds with 4 kc./s. In this system, the risk of interference in a channel due to signalling in another channel is, consequently, particularly small.

All required carrier-wave frequencies are multiples of 4 kc./s.

Figure 4:
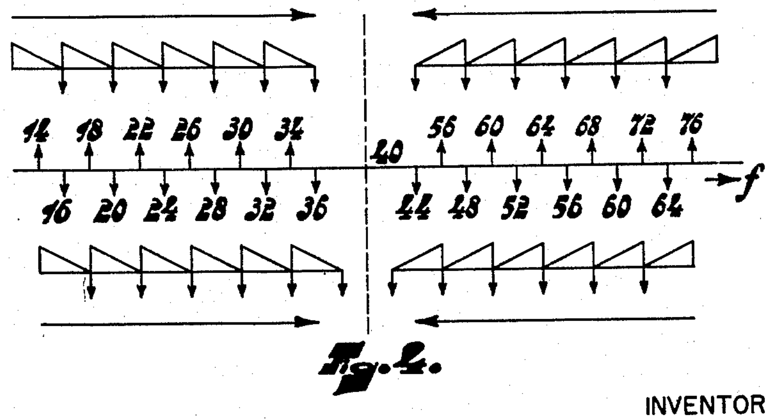

If simplification of the channel bandpass filters is not desired in the first place, whilst the requirements with respect to cross-talk between adjacent channels of adjacent pairs are to be fulfilled and if it is desired to have a simple signalling apparatus, a system having the frequency diagram shown in Fig. 4 may be used.

In this case, the bands of successive channels of one pair are adjacent one another in one direction, so that the frequency interval between the carrier-waves is 4 kc./s.

The channels of the groups in two pairs in the same direction have a relative frequency shift of 2 kc./s.

The signalling carrier-waves are again transmitted through the phantom circuit.

What I claim is:

1. A single-sideband carrier-wave telephone system comprising two adjacent pairs of conductors, a phantom circuit for said two pairs of conductors, means to transmit a first group of channels in a given direction via one pair of conductors, means to transmit a second group of channels in the same direction via the other pair of conductors, said first and second groups of channels lying within the same group frequency band, the channels of one group having a frequency shift with respect to the channels of the other group, an intelligence signal carrier-wave source associated with each channel of said two groups, a signaling carrier-wave source associated with each channel of said two groups, a plurality of signaling carrier-wave frequencies in the channels of one of said groups being equal to the intelligence signal carrier-wave frequencies in the channels of the other group and conversely, and means to transmit the intelligence signal carrier-waves and signaling carrier-waves through said phantom circuit of said two pairs.

2. A single-sideband carrier-wave telephone system comprising a phantom circuit, a first source of signals comprising a first group of channels having a plurality of intelligence signal carrier-waves associated respectively with said channels, a second source of signals comprising a second group of channels having a plurality of intelligence signal carrier-waves associated respectively with said last-named channels, the channels of said first group having a frequency shift with respect to the channels of said second group whereby at least some of the intelligence signal carrier-waves of said first group fall within the channels of said second group and conversely, means connecting said first and second sources of signals to said phantom circuit, and means to utilize said intelligence signal carrier-waves of one group which fall within channels of the other group as signaling carrier-waves in said other group.

References Cited in the file of this patent

UNITED STATES PATENTS

| | | |
|---|---|---|
| 2,009,438 | Dudley | July 30, 1935 |
| 2,111,023 | Dixon | Mar. 15, 1938 |
| 2,624,806 | Wright et al. | Jan. 6, 1953 |